(No Model.)
J. E. LOUTHIAN.
HOSE COUPLING.
No. 475,406. Patented May 24, 1892.
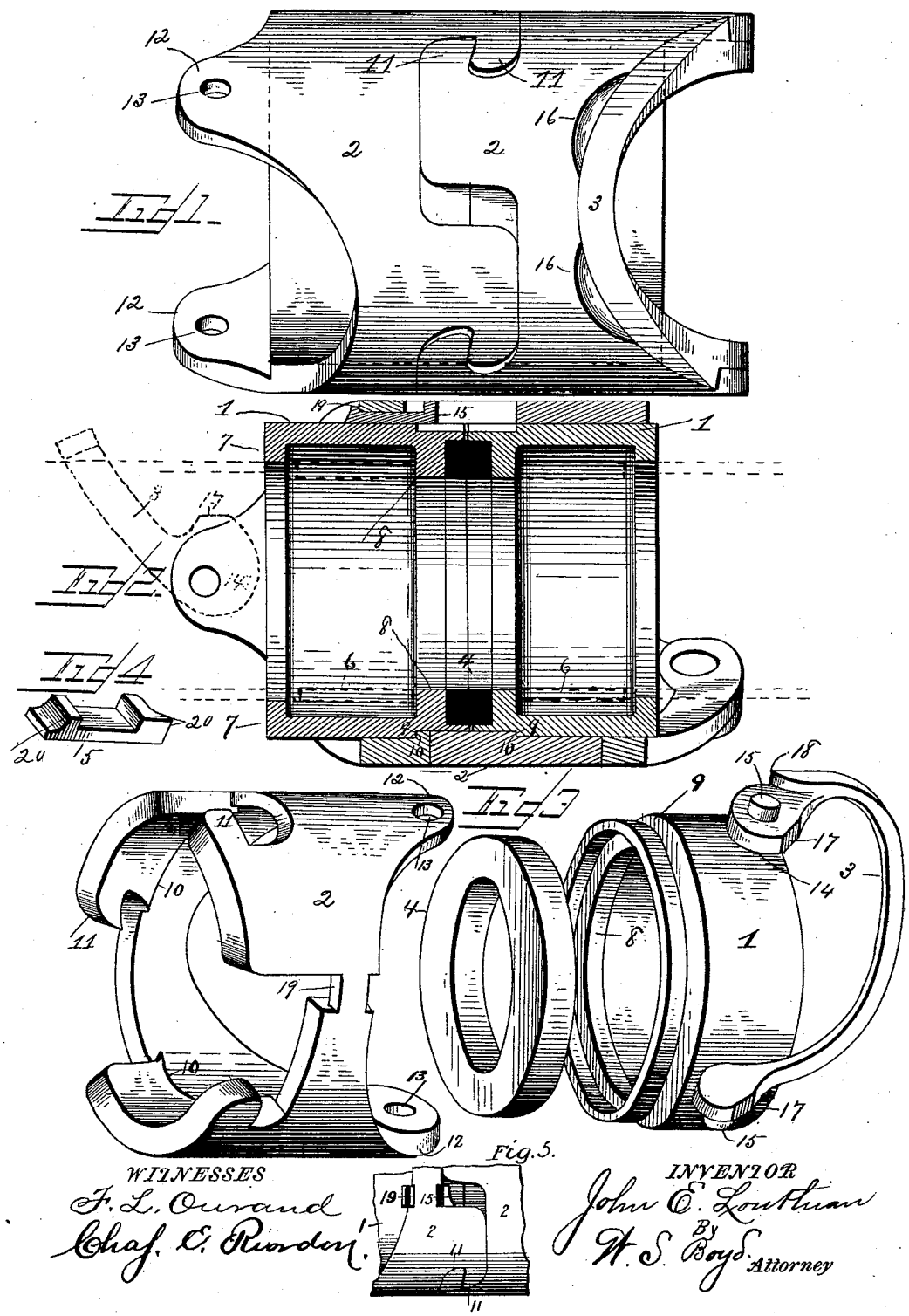

UNITED STATES PATENT OFFICE.

JOHN EMMETT LOUTHIAN, OF ETIWANDA, ASSIGNOR OF TWO-FIFTHS TO ROBERT YORK, OF SAN BERNARDINO, CALIFORNIA.

HOSE-COUPLING.

SPECIFICATION forming part of Letters Patent No. 475,406, dated May 24, 1892.

Application filed August 29, 1891. Serial No. 404,126. (No model.)

*To all whom it may concern:*

Be it known that I, JOHN EMMETT LOUTHIAN, a citizen of the United States, residing at Etiwanda, in the county of San Bernardino and State of California, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to hose-couplings, and has for its objects to provide a coupling that can be quickly and easily coupled and without the use of separate tools or wrenches, &c., and can be locked against accidental uncoupling, if desired; that has a smooth exterior to prevent its catching upon objects as the hose is being drawn in either direction, and either end of any section may be coupled to either end of any other section, and that is strong and durable and can be cheaply made; and it consists in the construction and combination of parts, as will be hereinafter more fully set forth.

In the accompanying drawings, Figure 1 is a side elevation of my improved coupling. Fig. 2 is a longitudinal sectional view of the same. Fig. 3 shows detail views of one half of the coupling. Fig. 4 is a detail of the lock-bolt or key; and Fig. 5 is a broken plan view of the coupling, on a reduced scale, showing the key partly pushed in to lock the parts together.

The coupling consists of two halves, which are exact duplicates of each other, one half being attached to each end of each section of hose, so that when the ends of the sections are brought together the two halves will fit into each other and effect the coupling. In the description of my coupling I will therefore only describe the parts comprising one half, although the same numerals of reference will indicate corresponding parts in each of the halves in the drawings. The coupling may be made out of any suitable material and may be of any suitable size to correspond with the hose upon which they are to be used. Each half of the coupling comprises four parts: the head 1, which is connected with the end of the hose; the sleeve 2, which fits around the head and which connects with the sleeve of the opposite half and effects the coupling; the bail 3, which is pivotally connected with the sleeve and engages with one end of the head and forces the head against the opposite head to make a tight joint between them, and a washer 4 at the contacting end of the head, which is compressed by the movement of the head by the bail. If desired, a lock-bolt or key 5 may be inserted between the head and sleeve to prevent accidental uncoupling. The head 1 may be connected or secured to the end of a section of hose in any desired manner—as, for instance, by means of a crimped or expansion ring 6, which is only shown in dotted lines, and which is inserted within the end of the hose after it has been inserted in the head and released, which will cause the hose to be forced outwardly against the interior of the head with sufficient force to prevent the head from being pulled off the hose.

To assist the ring in holding the head and hose together, the interior of the head is preferably provided with one or more interior flanges 7, which are located at or near the rear end of the head and which will form a shoulder against which the hose is held by the ring. Near the front end of the head is another interior flange 8, against the rear side of which the end of the hose abuts, and against the front side of which the washer 4 abuts, and may be permanently secured by means of cement to prevent its becoming lost or misplaced. In front of the flange 8 the head is formed into a rim, which surrounds the washer a portion of its length or thickness and prevents the excessive outward expansion of the washer when the two heads are forced together in coupling. The rims also assist in holding the interlocking portion of the coupling when brought together. The exterior of the head is cylindrical and perfectly smooth, except near its front end, where it is provided with an offset or shoulder 9. The sleeve 2 is cylindrical and fits loosely upon the head, so that it may be easily rotated upon it in effecting a coupling. Its exterior is perfectly smooth, so that it will not catch or engage with any obstruction as the hose is being drawn along, and its interior is also smooth, except a shoulder 10, which engages with the shoulder 9 of the head and limits the forward movement of the head. The front end of the sleeve is provided with two or more hooks 11, which engage with corresponding hooks upon the opposite half of the coupling and hold the two sections of hose together. The hooks are equally spaced around the end of the sleeve with the spaces between them just wide enough to permit of the ready passage of the hooks of the opposite half in connecting or disconnecting them. The points of the hooks are preferably slightly inclined to the rear, so that after they have been made to engage with the hooks of the opposite half, which is done by passing the hooks into or through the spaces between the opposite hooks and giving the sleeves a partial rotation, the contacting-faces will engage with each other and the longitudinal strain upon the sections of hose will prevent the disengagement of the hooks. The front ends of the hooks are preferably made rounding, so that they will readily enter the recesses of the opposite half, which are also made rounding, and by making the hooks about double the length of the distance from the shoulder 9 to the end of the head they will completely surround the rim of the head and reinforce it, except at the spaces exposed by the rotation of the sleeves in effecting the coupling. The shoulder 10 is located at the base of the hooks, which thus gives additional thickness to the hooks and enables the points to be made very short, which will require but a slight rotation and will yet be very strong. The opposite end of the sleeve is provided with two rearwardly-projecting ears 12 12, located upon diametrically-opposite sides of the sleeve and each provided with a hole or perforation 13. These ears extend back beyond the rear end of the head such a distance that when the bail 3 is placed within the holes 13 a cam-surface 14 upon the end of the bail will engage with the end of the head, and by swinging the bail upon its pivots 15 the head will be moved through the sleeve. The bail is preferably inserted into the ears from the interior, so that the hose will bear against the inner surface of the ends of the bail and will prevent their accidental removal. The bail is semi-elliptical in shape, so that when it is standing at right angles to the axis of the hose the middle portion of it will be at a slight distance from the hose. This will permit of quite a swing of the bail from its contact with the hose when in its outward position, as shown in dotted lines in the drawings, to its closed position against the end of the sleeve when the coupling is effected. This swing of the bail permits of the cam or eccentric 14 being made great enough to force the heads of the opposite sections together with considerable power, which compresses the washers and makes a tight joint between them. In forming the ears the end of the sleeve is cut away upon each side to correspond with the curve of the bail, so that when the bail is turned down against the end of the sleeve in locking the heads together the exterior surface of the bail will be even with the exterior of the sleeve and present a smooth surface that will slip over obstructions and will also prevent the liability of the bail being turned away from the sleeve and opening the joint between two sections. Notches 16 may be made in the end of the sleeve, by means of which access may be had to the rear of the bail and it may be forced outward when the hose is uncoupled. To prevent the pressure against the cam or eccentric throwing the bail outward after it has been turned down against the sleeve, the apex of it may be cut off flat, as at 17, which will rest against the end of the head and have a tendency to force the bail against the end of the sleeve. For the purpose of giving a good broad flat surface for the working of the cam I prefer to locate the flange 7 at the rear end of the head and to cut it off even with the end of the head and parallel with the axis of the pivots of the bail.

In using the coupling as above described the head is first inserted into the sleeve from the rear until its shoulder near the front end engages with the shoulder upon the interior of the sleeve. The bail is then inserted by placing one of its pivots in the hole in one of the ears and then springing the opposite end of the bail inward until its pivot will pass into the inner side of the opposite ear. The bail is then released, when it will spring outward and cause the pivot to enter the hole in the ear and secure it in place. Although I have shown the bail provided with a shoulder 18, which will fit against the end of the sleeve when it is turned down and will make a smoother surface, it is evident that the shoulder could be dispensed with and the end of the bail could be formed into a double cam, so that the bail could be turned in either direction to force the heads together. After the parts have been thus assembled and the washer, which may be of leather, rubber, or other compressible material, is inserted in the front end of the head the end of a section of hose may be inserted from the rear and secured by the ring 6, as described.

When it is desired to use the lock-bolt or key 5, one or both of the sleeves of a coupling is provided with a notch 19 upon its interior at the rear of one of the hooks and the key is placed in the slot with each end projecting beyond the ends of the sleeve at that point. Each end of the key is provided with a lug or projection 20, which stands substantially even with the exterior of the sleeve and prevents the key from slipping out of the notch and also gives a handle for catching hold of in slipping the key forward or back in locking or unlocking the coupling. The key is of such width that after the coupling has been effected by interlocking the hooks by rotating the sleeves upon the heads the key is slipped forward and engages with the rear faces of two hooks and prevents their backward rotation until the key has been withdrawn. The inner surfaces of the hooks may be made slightly rounding, so as to more readily slip over the washer and end of the head of the opposite half of the coupling, and instead of the shoulder 10 being located at the base of the hooks it may be made farther to the rear and the shoulder 9 upon the head be made to correspond. This will prevent the liability of sand and dirt getting between them and interfering with their operation. Before interlocking the hooks the bails are turned outward as far as they will go, which will let the head slip back so as not to interfere with the fastening of the hooks, after which one or both of the bails may be turned back against the ends of the sleeves. If the washers are new or of sufficient width or thickness, it will only be necessary to turn down one of the bails; but after they have been compressed in constant use both bails may be turned down, which will double the movement of the heads toward each other.

By using the hooks and cams in a coupling the longitudinal strain upon the coupling is borne by the hooks, which can be made very strong and substantial, and the tightening of the joint is effected by the cam, which may be varied to suit the circumstances, and by dispensing with screw-threads a cheaper coupling can be made and one that can be operated much more quickly than where it is required to screw one part into or upon another.

When it is desired to attach a section to a fire-hydrant nozzle or other kind of a suitable coupling, a union-section may be used.

The hooks of the coupling are all made to point in one direction, so that the coupling is effected by turning the sleeves in the direction of turning a screw, and by making the interior of the washer and of the ring within the end of the hose in the head of the same or a trifle larger diameter than the interior of the hose the capacity of the hose is not affected by the coupling.

Having thus described my invention, I claim—

1. A hose-coupling consisting of two halves, each being the duplicate of the other, comprising a head adapted to be connected with the end of a section of hose, a sleeve encircling the head and having a smooth exterior, and a bail pivotally secured to the sleeve and adapted to engage with the head and move it longitudinally of the sleeve independently of the connection with or movement of the other half of the coupling, substantially as described.

2. In a hose-coupling, a head provided with a washer and adapted to be connected with the end of a section of hose, a sleeve encircling the head and having hooks at one end and ears at the other end, and a bail pivotally secured to the ears and provided with cams for engaging with the head, substantially as described.

3. In a hose-coupling, a head provided with a washer and adapted to be connected with the end of a section of hose and provided with an exterior shoulder, a sleeve encircling the head and provided with an interior shoulder adapted to engage with the shoulder of the head, said sleeve being also provided with hooks at one end and with ears at the other end, a semi-elliptical bail pivotally secured within the ears and having its ends provided with cams for engaging with the end of the head, substantially as described.

4. In a hose-coupling, a head provided with a forwardly-projecting rim and an interior flange near its front end, a washer within the rim and secured to the flange, a sleeve encircling the head, having hooks projecting beyond the front of the rim and of the washer, the inner surface and the ends of which are rounding, a bail pivotally secured to the rear end of the sleeve and adapted to be turned down even with the surface of the sleeve, each end of the bail being provided with a cam, substantially as described.

5. In a hose-coupling, a head adapted to be connected with the end of a section of hose, a sleeve encircling the head, one end of which is provided with forwardly-projecting hooks and the opposite end is provided with ears, a bail pivotally secured to the ears, provided with cams for engaging with the end of the head, and a key adapted to be slipped longitudinally of the coupling and to engage with the hooks thereof and prevent the unclasping of the hooks, substantially as described.

In testimony whereof I affix my signature in presence of two witnesses.

JOHN EMMETT LOUTHIAN.

Witnesses:
J. C. BOYD,
GEO. A. FERGUSON.